No. 810,752. PATENTED JAN. 23, 1906.
J. I. HATFIELD.
SPOUT FOR COLLECTING CRUDE TURPENTINE.
APPLICATION FILED NOV. 10, 1905.
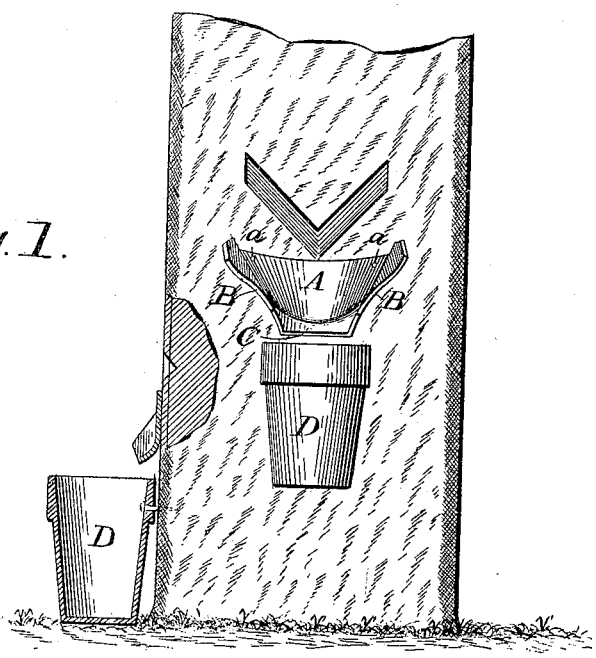
Fig. 1.
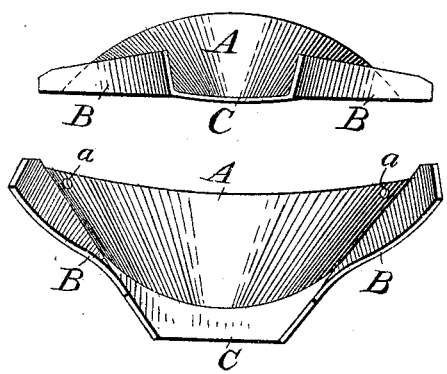
Fig. 2.
Fig. 3.
Witnesses
F. L. Ourand
C. E. Webb
Inventor
James I. Hatfield
By Eugene W. Johnson
Attorney

UNITED STATES PATENT OFFICE.

JAMES I. HATFIELD, OF DOUGLAS, GEORGIA, ASSIGNOR OF ONE-HALF TO JOSHUA H. DENT, OF DOUGLAS, GEORGIA.

SPOUT FOR COLLECTING CRUDE TURPENTINE.

No. 810,752.　　　Specification of Letters Patent.　　　Patented Jan. 23, 1906.

Application filed November 10, 1905. Serial No. 286,706.

*To all whom it may concern:*

Be it known that I, JAMES I. HATFIELD, a citizen of the United States, residing at Douglas, in the county of Coffee and State of Georgia, have invented certain new and useful Improvements in Spouts for Collecting Crude Turpentine, of which the following is a specification.

My invention appertains to specific improvements in spouts for collecting crude turpentine, the purpose of my invention being to provide a spout that is made up from a single piece of sheet metal shaped to provide a curved upper edge and below said edge a concave portion which terminates in an inclined discharge-spout, the side edges of the sheet projecting outward and converging toward the discharge end of the spout, whereby such spout may be attached to a tree to partially encircle the same and closely embrace the exterior thereof to gather sap or resin which exudes from the cuts made in the tree above the point of attachment of the spout.

In the accompanying drawings, which illustrate one form of my invention, Figure 1 is a view showing the invention applied, such view embodying a front elevation and a section. Fig. 2 is a view looking directly toward the spout when the same is held in a horizontal position, and Fig. 3 is a front elevation on a larger scale than is shown by Fig. 1.

Upon the drawings, A refers to the upper edge of the spout, B B the sides, and C the lower projecting portion, such part projecting outward to guide the sap or resin into a suitable receptacle which may be placed on the ground or nailed to the tree, as is usually practiced. In practice the plate is bent in the segment of a circle, so as to closely embrace the tree when attached thereto, and as a convenient means of securing the device in position perforations a are present, they being located at the upper corners of the spout.

In practice the tree is chipped above the point of attachment of the spout, and below the spout is placed a receptacle, several spouts and receptacles being applied to a tree at the same time, and the crude turpentine which exudes from the chipped portion of the tree will be gathered by the spout and led into the receptacle. This device may be readily attached and detached. Being of sheet metal, it can be sprung or shaped to fit trees of different sizes, and to the trade these spouts are furnished in several different sizes.

This spout may remain in the same position upon a tree for a gathering season, and as the discharge end of the spout is only sufficiently long to lead the crude turpentine to a receptacle there will be but very little resin that adheres thereto—not sufficient to require cleaning, as would be necessary if the resin was gathered in an attached cup, as is sometimes practiced.

I claim—

As an improved article of manufacture, a seamless sheet-metal spout for gathering turpentine, comprising a body portion having a curved upper edge from which extends a concave portion, the curved edge and concave portion being adapted to lie against the surface of a tree, a part which projects from the lower part of the concave portion, and raised sides which converge from the upper edge downward, and perforations through the upper portion of the plate, substantially as shown.

JAMES I. HATFIELD.

Witnesses:
C. E. WEBB,
FRANK S. APPLEMAN.